J. G. HEASLET.
DIFFERENTIAL BEARING SUPPORT.
APPLICATION FILED FEB. 4, 1915.
1,180,715.
Patented Apr. 25, 1916.
2 SHEETS—SHEET 1.
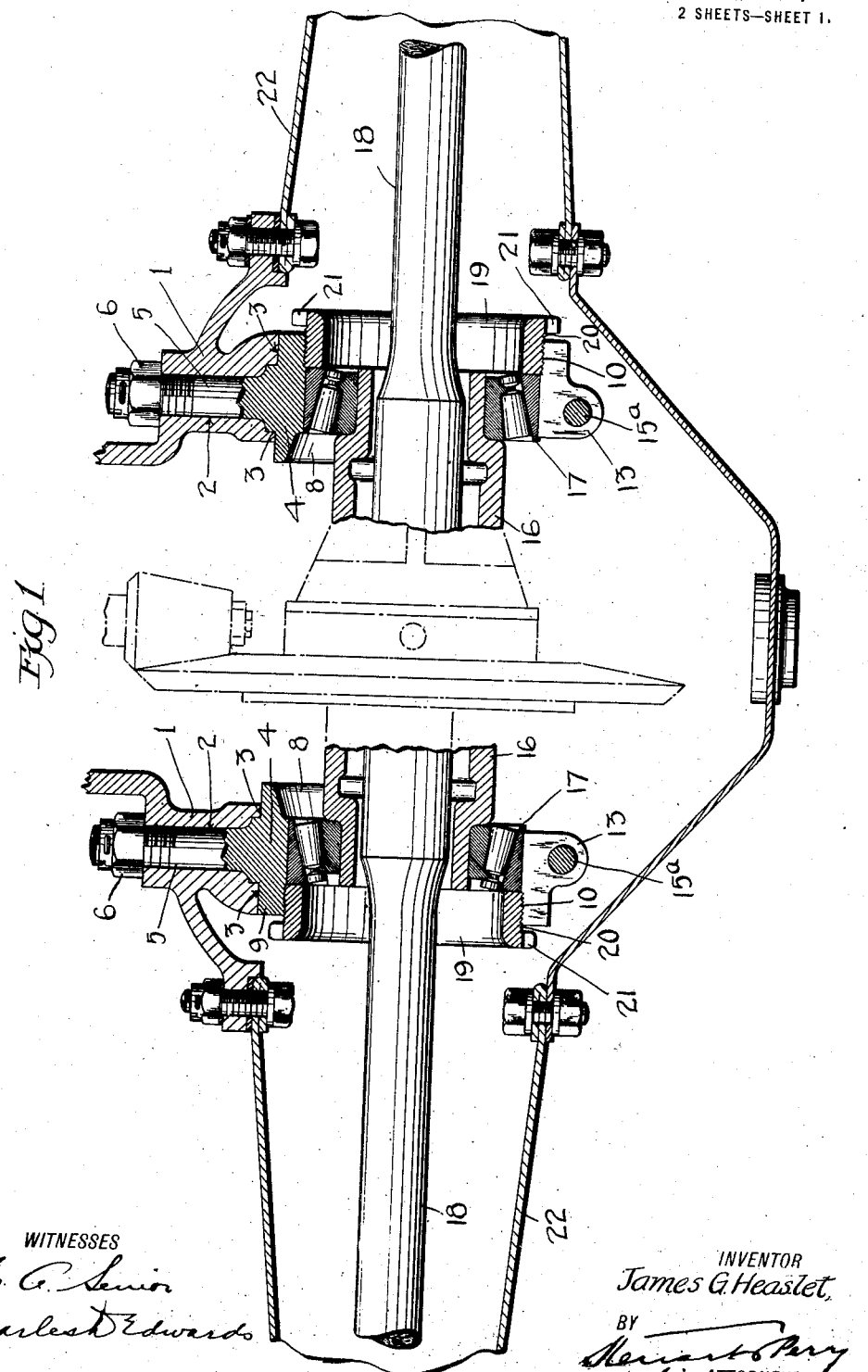
WITNESSES
INVENTOR
James G. Heaslet,
BY
ATTORNEYS J. G. HEASLET.
DIFFERENTIAL BEARING SUPPORT.
APPLICATION FILED FEB. 4, 1915.
1,180,715.
Patented Apr. 25, 1916.
2 SHEETS—SHEET 2.
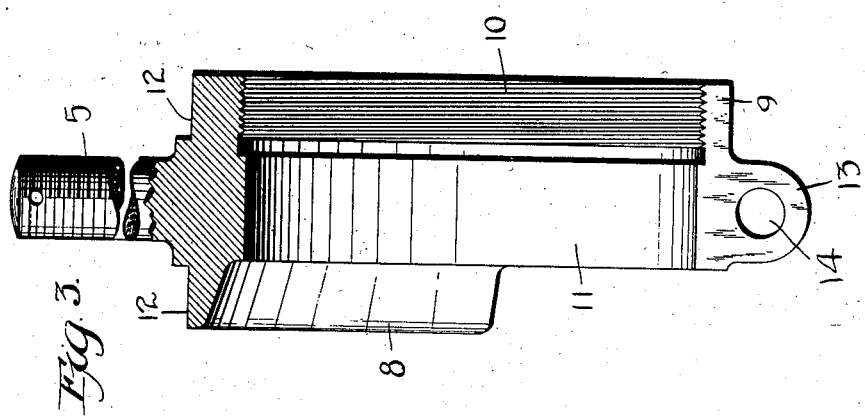
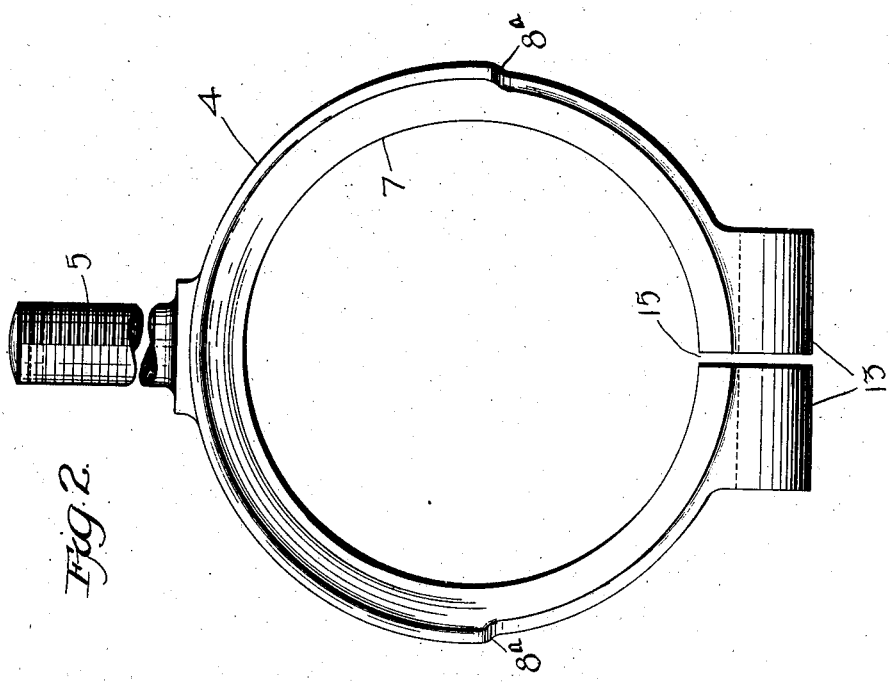
WITNESSES
INVENTOR
James G. Heaslet,
BY
ATTORNEYS

UNITED STATES PATENT OFFICE.

JAMES G. HEASLET, OF DETROIT, MICHIGAN, ASSIGNOR TO THE STUDEBAKER CORPORATION, A CORPORATION OF NEW JERSEY.

DIFFERENTIAL-BEARING SUPPORT.

1,180,715.   Specification of Letters Patent.   Patented Apr. 25, 1916.

Application filed February 4, 1915. Serial No. 6,078.

*To all whom it may concern:*

Be it known that I, JAMES G. HEASLET, a citizen of the United States of America, and resident of the city of Detroit, county of Wayne, State of Michigan, United States of America, have invented certain new and useful Improvements in Differential-Bearing Supports, of which the following is a specification.

This invention relates to means for supporting and adjusting the differential bearings of motor vehicles.

The differential is usually housed within a casting and is supported between recessed sections of the casting and cap members coöperating with said recessed sections to form bearings and supports for the differential, the caps being secured to the body of the casting by suitable screws.

In order to accomplish the adjustment of the differential, it is necessary that these supporting and bearing members shall be internally screw-threaded, and difficulty has been found in accomplishing this screw-threading between two separable members.

Other difficulties have been presented in accomplishing the locking of the bearings within the supporting member.

It is the purpose of this invention to overcome these difficulties by providing a separate and independent support for the differential which can be manufactured as an entirety and anchored to the main casting or differential housing by suitable means.

I have illustrated my invention in the accompanying drawings, designating the parts by numerals, referring to like parts by like numerals.

Figure 1 is a horizontal section taken through the differential housing and showing the axles. Unnecessary parts of the differential are omitted. Fig. 2 is an elevation of the supporting member, which is the subject-matter of this invention, while Fig. 3 is a section thereof.

1 is a part of the major casting which is adapted to contain the differential and other mechanism coöperating therewith, which differential mechanism is conventionally shown in Fig. 1 of the drawings in dot-and-dash lines. 2 is a bolt-hole through said casting 1, while 3 is a seat adapted to receive and support one side of the supporting member hereafter to be described.

I have designated the supporting member as a whole as "4," the same being illustrated in Figs. 2 and 3. This member is substantially in the form of a ring and is provided with a retaining post 5 extending radially from said ring. Said post 5 is adapted to enter the aperture 2 and be secured therein by the nut 6. The member 4 has a central cylindrical aperture 7 and is provided with the extension flange 8, embracing half of its circumference to the point $8^a$. This flange operates as a supporting brace, lending rigidity to the structure. The extension 9 forming part of the ring is internally screw-threaded as at 10. The internal periphery 11 of the ring is provided with a smooth surface. The external periphery 12 is adapted to rest in the seat 3, the latter being cut out of the casting in a manner to receive that section of the ring and to afford additional support for the same. That portion of the ring opposite the retaining post is provided with a boss 13, which is pierced by a bolt-hole as at 14. The ring is radially divided as at 15. The divided sections of the ring are united by a bolt and nut as at $15^a$.

16 is part of the differential casing and 17 indicates what is well known as the Timken roller bearing.

18 and 18 are axles.

19 are rings externally screw-threaded as at 20 and provided with lugs 21 by means of which the ring 19 may be rotated.

In the construction of the supporting member 4, I prefer to concentrate the weight of metal adjacent the binding post 5 and cause the same to taper off in weight toward the opposite side of the ring. This is done for the purpose of giving strength to the supporting member where such strength is most needed. It will be appreciated that this supporting member 4 may be manufactured as a unit from any suitable metal apart from the main casting, which forms the supporting means for the differential and other mechanism. When so constructed it is easily applied and secured in position by introducing the binding post 5 inside the bolt-hole 2 and securing the same therein by the nut 6, that side of the ring indicated as 12 finding its seat in a suitable recess in the main casting. By this means ring 4, for all practical purposes, becomes homogeneous with the main casting. Should it require repair for any reason, it may be conveniently removed and replaced.

To assemble the Timken bearings within the ring and adjust such oppositely-disposed bearings in their relation to the differential, I place the Timken bearing within the smooth section of the ring indicated as 11 and then screw ring 19 into the screw-threaded aperture 10, and when a proper adjustment is found I lock the bearing within the ring by means of the screw 15ª. It will be understood that the reverse of this operation permits the release of the mechanism.

What I claim is:

1. In motor vehicle construction, differential supporting means embodying a casing, an annular member provided with a retaining post extending radially from said member, and means for securing the post to the casing, said annular member being heavier adjacent the post and tapering in weight of metal to a point opposite said post, at which point said member is parted, the internal periphery of said member being substantially smooth except adjacent one edge thereof where it is screw-threaded, in combination with roller bearings mounted within the smooth portion of the annular member, an externally threaded ring screwed into the threaded portion of the annular member, and means coöperating with the parted annular member for normally maintaining it in contracted form.

2. In motor vehicle construction, differential mechanism, in combination with means for supporting the same embodying an apertured casing to house the differential mechanism, annular members positioned at each side of said mechanism, a radial post on each annular member, which posts extend through the apertures of the casing, means for rigidly maintaining the posts in such position, and means positioned within said annular members for supporting the differential mechanism against bodily lateral movement.

3. In motor vehicle construction, differential mechanism, in combination with means for supporting the same embodying an apertured casing to house the differential mechanism, parted annular members positioned at each side of said mechanism, a radial post on each annular member, which posts extend through the apertures of the casing, means for rigidly maintaining the posts in such position, anti-friction bearings positioned within each annular member for supporting the differential mechanism, and means for locking each parted annular member in contracted position about its respective bearing.

4. In motor vehicle construction, differential mechanism, in combination with means for supporting the same embodying an apertured casing to house the differential mechanism, parted annular members positioned at each side of said mechanism, a radial post on each annular member, which posts extend through the apertures of the casing, means for rigidly maintaining the posts in such position, anti-friction bearings positioned within each annular member for supporting the differential mechanism, means for longitudinally shifting said bearings relative to their respective annular members, and means for locking each parted annular member in contracted position about its bearing-shifting means for precluding inadvertent shifting of said bearings.

5. In motor vehicle construction, differential mechanism, in combination with means for supporting the same embodying an apertured casing to house the differential mechanism, parted annular members positioned at each side of said mechanism, a radial post on each annular member, which posts extend through the aperture of the casing, means for rigidly maintaining the posts in such position, anti-friction bearings positioned within each annular member for supporting the differential mechanism, rings threaded into said annular members for longitudinally shifting said bearings relative to their respective annular members, and means for locking each parted annular member in contracted position about its bearing-shifting ring for precluding inadvertent shifting of said bearings.

6. In motor vehicle construction, differential mechanism, in combination with means for supporting the same embodying a casing to house the differential mechanism, annular members positioned within said casing and supporting the differential mechanism, a rigid post secured to each annular member, and means for rigidly securing said posts to the casing whereby the differential mechanism is mounted upon the casing against bodily, longitudinal or lateral movement.

7. In motor vehicle construction, differential mechanism, in combination with means for supporting the same embodying a casing to house the differential mechanism, annular members positioned within said casing and supporting the differential mechanism, a threaded rigid post secured to each annular member and passing through apertures in the casing, and threaded members coöperating with the threaded posts exteriorly of the casing for rigidly securing said posts thereto whereby the differential mechanism is mounted upon the casing against bodily longitudinal or lateral movement.

8. In motor vehicle construction, differential mechanism, in combination with means for supporting the same embodying a casing to house the differential mechanism, parted annular members positioned within said casing and supported in spaced relation thereon, means positioned within the annular members for supporting the differential mechanism, and means for locking the parted annular members in contracted form, each of said parted annular members being tapered in weight of material to the point where it is parted, whereby maximum resiliency of said annular members is obtained.

9. In motor vehicle construction, a casing, and differential mechanism housed therein, in combination with a differential supporting element embodying an annular member adapted to be clamped about a portion of the differential mechanism for the purpose of supporting the same, and a threaded stem on said annular member adapted to be passed through an aperture in the casing and secured externally thereof for the purpose of fixedly positioning said annular member interiorly of the casing.

Signed by me at the city of Detroit, Michigan, this 29th day of January 1915.

JAMES G. HEASLET.

Witnesses:
  G. M. EGGLESTON,
  R. E. SCRATCH.